Figure 1:
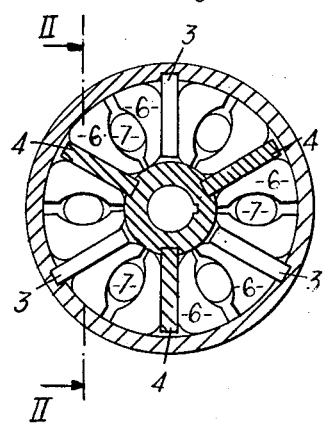

July 20, 1965   D. G. J. SELLWOOD ETAL   3,195,324
FLEXIBLE COUPLINGS
Filed June 17, 1963   4 Sheets-Sheet 1

Inventors
DAVID GRENVILLE JOHN SELLWOOD
MICHAEL HUGH ELSON
BY Bacon & Thomas  Attorneys July 20, 1965 D. G. J. SELLWOOD ETAL 3,195,324
FLEXIBLE COUPLINGS
Filed June 17, 1963 4 Sheets-Sheet 2

Inventors
DAVID GRENVILLE JOHN SELLWOOD
MICHAEL HUGH ELSON
BY Bacon & Thomas Attorneys

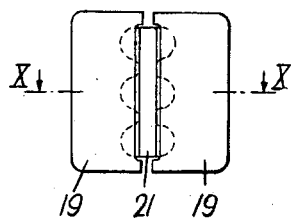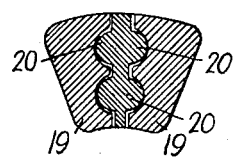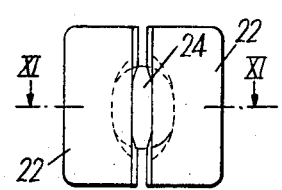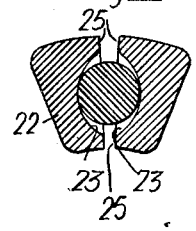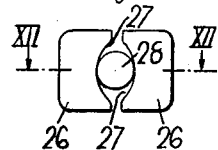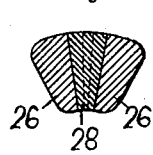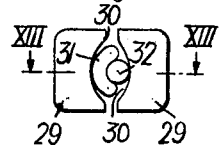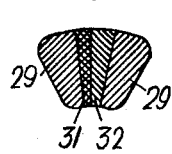

Inventors
DAVID GRENVILLE JOHN SELLWOOD
MICHAEL HUGH ELSON
BY
Attorneys

United States Patent Office 3,195,324
Patented July 20, 1965

3,195,324
FLEXIBLE COUPLINGS
David G. J. Sellwood, 44 Richmond Road SW. 20, London, England, and Michael H. Elson, % Yarsley Research Laboratories, Limited, Clayton Road, Chessington, England
Filed June 17, 1963, Ser. No. 290,274
Claims priority, application Great Britain, June 21, 1962, 23,993/62
7 Claims. (Cl. 64—14)

This invention is concerned with improvements in or relating to flexible couplings, dampers, flexible gear wheels and the like for connection between a driving member and a driven member, to transmit torque. It is furthermore concerned with couplings of the general type comprising two concentric members which each have a number of blades or arms which extend substantially radially of the members and are so arranged that each blade on one member extends between a pair of blades on the other member so that a cell is formed between each pair of adjacent blades and portions of the concentric members. Such couplings are completed by the introduction into each cell of a coupling element of rubber or other elastomeric material which provides a resilient and reversible connection between the two members. Such couplings are hereafter referred to as "couplings of the kind described."

In couplings of the kind described utilising a single block of rubber or the like as the coupling element in each cell it has frequently been difficult to insert such blocks into the cells when installing the coupling or when replacement is necessary especially when some deformation of the blocks is necessary.

A further disadvantage of couplings of the kind described has been that depending on the physical characteristics of the elastomeric material employed for the block the response of the coupling to differing loads has varied. Thus with blocks of relatively soft material the coupling exhibits a flexible response to light torque loads and therefore a large deflection under a heavy torque which is frequently undesirable while with a hard material a stiff response and a small deflection is exhibited under heavy torque loading but only at the expense of having very small deflections under low torque loading. Indeed with known couplings of the type described it is only over a narrow range of applied torques that the desirable feature of a flexible response to a light load and a stiff response to a heavy load can be achieved by careful selection of the material from which the blocks are made.

It is an object of the invention to provide improved couplings of the kind described in which the above disadvantages are substantially reduced, which couplings are versatile and exhibit a soft response at low torque and a stiff response at high torque over a wide range of applied torque loads and in which the insertion and removal of the blocks from the cells is a relatively simple operation as compared with known couplings of the kind described.

According to the invention there is provided a coupling of the type described in which the coupling element in each cell is made up of two or more components of non metallic resilient material at least one component in each cell being of a soft material and at least another component in each cell being of a harder material, the said components being so disposed and arranged with respect to each other that upon the application of torque to one member relative movement takes place between adjacent contacting surfaces of the respective components of the coupling element.

The non metallic resilient material used for the components of the coupling elements may be a natural or synthetic material having elastomeric properties to a greater or lesser extent and thus, for example, may be natural rubber, synthetic poly cis-isoprene, an elastomeric styrene-butadiene copolymer, an elastomeric acrylonitrile-butadiene copolymer, a polychloroprene elastomer, a polyurethane elastomer e.g. a polyester urethane elastomer or a polyether urethane elastomer, butyl rubber (i.e. an elastomeric copolymer of isoprene and isobutylene), an elastomeric copolymer of an acrylic or methacrylic ester and butadiene, poly cis-butadiene, an elastomeric ethylene-propylene copolymer, a chlorosulphonated polymer or copolymer e.g. a chlorosulphonated polyethylene, a ketonic elastomer or an elastomer derived from a fluorohydrocarbon. The elastomer may be compounded with desired additives including fillers, vulcanising or crosslinking agents, accelerators, activators, softeners, antioxidants etc. in order to obtain a coupling element component having the desired physical characteristics particularly hardness or softness as the case may be.

The ratio of hardness of the coupling component of harder material to that of the softer material must be greater than 1.0:1 on the Shore A scale and is preferably not greater than 2.0:1.

The components of each coupling element in couplings according to the invention are so shaped and disposed with respect to each other that upon the initial application of torque to one of the concentric members the soft component or components of the coupling element first undergo substantial deformation while subsequently larger torques cause significant deformation of the hard component or components. Thus when an initial light torque load is applied it is the soft components which largely determine the deflection transmitted to the other member, while when larger torques which deform the hard components are applied it is these hard components which mainly determine the deflection transmitted to the other member. It will be understood that since the various components of the coupling element have adjacent contacting surfaces there will generally be some slight deformation of the hard components even upon the initial application of torque.

In one simple and preferred embodiment of coupling according to the invention the coupling element in each cell is of sandwich form and comprises two hard components having a soft component between them. The two hard components, which if desired may be pressed towards one another for insertion into the cells will be of such shape and size that together, and with no torque applied they do not fill the cell and do not make contact with each other. Thus with the soft component between them initial application of torque to the coupling subjects the soft component to substantial deformation between the two hard components until those two components come into contact with each other whereafter continued increase in the applied torque causes significant deformation of such hard components.

Where sandwich type elements having more than three components are used it will be apparent that the hardness of the various components can all differ from each other the harder components in general being the outermost components.

In order to reduce friction between the components of the coupling elements in use of the coupling it is preferred so to shape the respective components that when the above mentioned relative movement between the components occurs in use there is a minimum of sliding movement between them in operation and as far as possible only relative rolling movement. Thus the inner or innermost soft component can be of circular cross section so as to roll on an arcuate surface of the contacting outer or outermost hard components.

We may bond, adhesively or otherwise, the components to each other at selected spots in a manner analogous to spot welding. Again we may provide a permanent flexible connecting link between the components by means of a wire, an elastomeric thread, cord or the like.

Alternatively a temporary interconnection between the components can be provided by one or more lugs, projections or the like on one component engagement in suitable grooves, recesses or the like in the other component or components.

Figure 2:
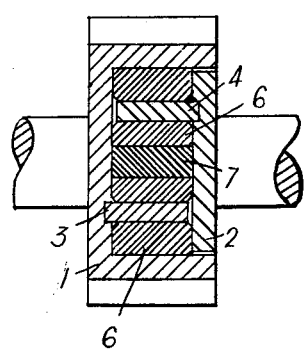
Figure 3:
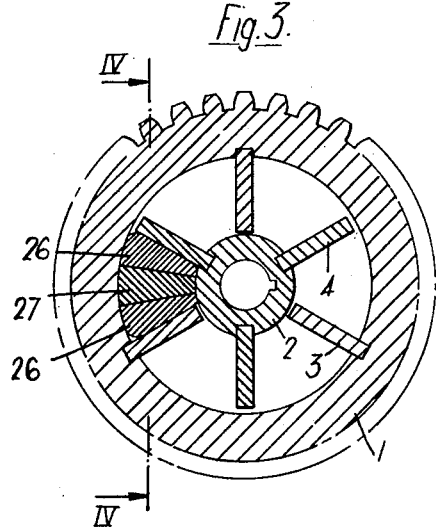
Figure 4:
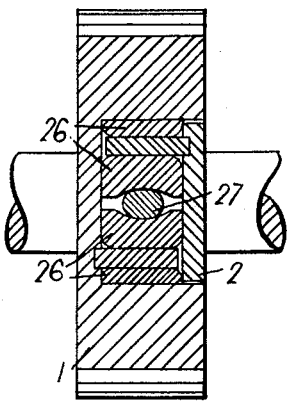
Figure 5A:
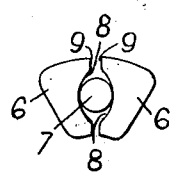
Figure 5B:
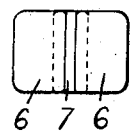
Figure 6A:
Figure 6B:
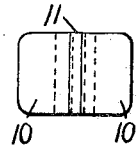
Figure 7:
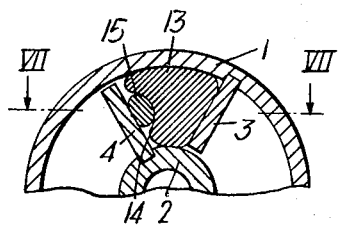
Figure 8:
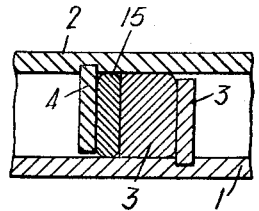
Figure 9A:
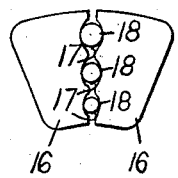
Figure 9B:
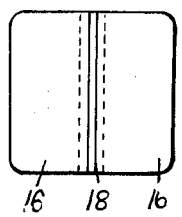
Figure 14A:
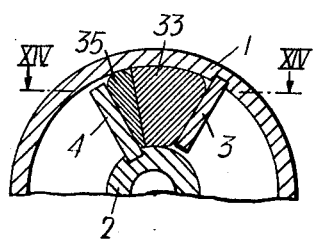
Figure 14B:
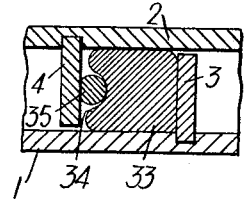
Figure 15A:
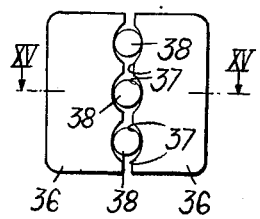
Figure 15B:
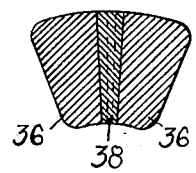
Figure 16A:
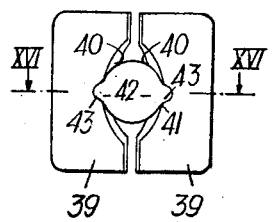
Figure 16B:
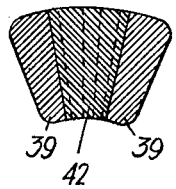

In order that the invention may be well understood some preferred embodiments thereof by way of example only will now be described with reference to the accompanying drawings in which:

FIGURE 1 shows a cross sectional view through a flexible coupling according to the invention of the type in which the soft components of the coupling elements are parallel to the axis of the coupling, FIGURE 2 is a section on the line II—II of FIGURE 1, FIGURE 3 is a cross sectional view of a flexible gear wheel according to the invention in which the soft components of the coupling elements are disposed radially of the axis, FIGURE 4 is a section on line IV—IV of FIGURE 3, FIGURES 5a and 5b are respectively, an end view and a plan view of a three component coupling element as used in the coupling of FIGURE 1, FIGURES 6a and 6b, are an end view and a plan view of a four component element with two soft components disposed parallel to the axis of the coupling, FIGURE 7 is a partial sectional view through a coupling similar to that shown in FIGURE 1 but with a two component coupling element, the soft component of which is parallel to the axis, FIGURE 8 is a section on line VIII—VIII of FIGURE 7, FIGURES 9a and 9b are an end view and a plan view of a five component coupling element in which the soft components are parallel to the axis of the coupling, FIGURES 10a and 10b are a plan view and a sectional elevation on line X—X of FIGURE 10a of a modified three component coupling element, FIGURES 11a and 11b are a plan view and a sectional elevation on line XI—XI of FIGURE 11a of another three component coupling element, FIGURES 12a and 12b are a plan view and a sectional elevation on line XII—XII of FIGURE 12a of a three component coupling element similar to that shown in FIGURES 5a and 5b but in which the soft component is disposed radially of the coupling, FIGURES 13a and 13b are a plan view and a sectional elevation on line XIII—XIII of FIGURE 13a of a four component element the soft components of which are disposed radially of the coupling, FIGURES 14a and 14b are a partial sectional view through a coupling and a sectional view on line XIV—XIV showing a radially extending two component coupling element, FIGURES 15a and 15b are a plan view and a sectional elevation on line XV—XV of FIGURE 15a of a radially extending five component coupling element and FIGURES 16a and 16b are a plan view and a sectional elevation on line XVI—XVI of FIGURE 16a of a modified radially extending three component coupling element.

Referring first to FIGURES 1 and 2 it will be seen that the coupling comprises two concentric members 1 and 2 either of which may be connected to a driving member while the other will be the driven member. Member 1 has three radially and inwardly extending blades 3 secured to it while member 2 has three radially and outwardly extending blades 4 secured thereto. It will be understood that more than three blades can be provided for each member, always provided that each member has the same number of blades. The members 1 and 2 are so mounted with respect to each other that the blades 3 and 4 alternate to form six cells each cell being bounded by a blade 3 and a blade 4. A coupling as so far described is a known type of coupling which has hitherto been completed by the insertion of a single unitary block of rubber or like material into each cell.

FIGURES 3 and 4 show an advantageous form of flexible gear in which there is a generally similar device to that shown in FIGURES 1 and 2 except that member 1 of FIGURES 3 and 4 has been shown as a toothed gear wheel.

In accordance with this invention coupling of the known kind described are provided with coupling elements in the cells which elements each consist of two or more components. In FIGURES 1 and 2 the soft components of the coupling element are arranged with their axes extending parallel to the axis of the coupling, while in FIGURES 3 and 4 the axes of the soft components extend radially of the coupling.

FIGURES 5a and 5b show one of the coupling elements as fitted in the coupling of FIGURES 1 and 2. This element comprises two hard components 6 and a soft component 7. The soft component 7 is of cylindrical shape. The hard components 6 which are of similar shape to each other have a circular arcuate groove 8 formed in them. The dimensions of the groove 8 that is to say the length and radius of the arcuate surface can of course be varied. It will be seen from FIGURE 5a which shows the coupling element in the relaxed or unstressed condition, that the soft component while contacting the groove 8 in each hard component does not fill the space between.

FIGURE 1 shows the elements in position in the cells and it will be observed that some predeformation has been applied to soft component 7 when inserting the element. The actual insertion of the component can be readily effected by partially separating the members 1 and 2 and after the elements are in position returning the members 1 and 2 to the position shown.

When torque is initially applied under light load to the coupling the soft component 7 is compressed and gives only a light and flexible response. At this stage the hard components 6 may also be subject to some deformation. As this deformation proceeds under increasing torque load the flat faces 9 on hard components 6 approach each other until they finally make contact with each other whereafter these hard components will then be significantly deformed. Since however they are harder the coupling will exhibit a stiff response to the high torque loading applied.

It will be appreciated that by variation in the dimensions and relative hardness of the components 6 and 7, the behavior of the coupling under light and heavy torques can be varied as may be required. While the three component coupling element is one preferred embodiment, many other arrangements of coupling element the components of which extend parallel to the axis may be used and some of these are shown in FIGURES 6 to 10 inclusive.

It will be understood that the deformation of the components as above described will be effective to transmit torque from the driving to the driven member by way of alternate cells around the coupling. Depending upon the load the soft component in the cells adjacent said alternate cells will be subjected to less deformation than the soft components in the alternate cells. It is preferred that the components of the coupling elements will be so designed that for all conditions within the intended operating range of a given coupling there will always be sufficient deformation of the soft components in all cells to prevent backlash.

FIGURES 6a and 6b show a four component element having two hard components 10, similar to those shown in FIGURES 5a and 5b. Here however two soft components 11 and 12 are provided. Component 12 which is cylindrical is softer than the curved component 11. The softer component 12 can readily be deformed to facilitate insertion of the element into the cells while soft component 11 and hard component 10 are the load bearing and transmitting components of the coupling.

FIGURES 7 and 8 show how a two component coupling element can be provided. This element comprises a block 13 of hard material having a groove 14 in one side face. The second component 15 which is soft and of circular cross section initially is initially deformed between blade 4 and block 13 until eventually the torque is transmitted through the hard block 13.

FIGURES 9a and 9b show a five component element made up of two similar hard components 16 having three grooves 17 of different radii of curvature. Three cylindrical soft components 18 of different diameters are disposed between the hard components.

FIGURES 10a and 10b show a modified three component coupling element where two hard components 19 each have two grooves therein to receive the nodular portions 20 of soft component 21.

In FIGURES 11a and 11b a further modified three component coupling element is shown. In this embodiment the hard components 22 each have a cup like recess 23 in their adjacent surfaces. A soft component 24 which could if desired be spherical but is here shown as being of generally ellipsoidal shape is seated in the two recesses 23 and is first deformed as torque applied to the coupling. Thereafter as the decesses become filled the opposed flat surfaces 25 of hard components 22 abut each other and heavy loads are transmitted under stiff response with deformation of the hard components.

Although FIGURES 3 and 4 show a flexible gear wheel it will be apparent that they could constitute a flexible coupling. The coupling elements used in FIGURES 3 and 4 are however disposed with the axes of the soft component radially of the coupling.

FIGURES 12a and 12b show one of the coupling elements as used in FIGURES 3 and 4. The coupling element comprises three components. There are two hard components 26 each of tapering width as seen in elevation and each having an arcuate cavity 27 extending over the whole inner face of the component. The element also has a soft component 28 which is of frusto conical form.

Coupling elements of this radially extending type can also easily be inserted or exchanged since the center soft component 28 can readily be deformed during fitting of the elements.

When torque is applied to such a coupling the action will again be similar to that described above.

FIGURES 13a and 13b show a four component coupling element analogous to that shown in FIGURES 6a and 6b but modified so as to extend radially of the coupling. This element of FIGURES 13a and 13b comprises two hard components 29 grooved on their inner faces at 30, and two soft components 31, 32. Component 32 which is of frusto conical shape is of a softer material than component 31 which is of tapered form as shown in FIGURE 13b.

In FIGURES 14a and 14b a radially extending two component coupling element is shown fitted in part of a coupling. The coupling element comprises a hard component 33 one surface of which abuts a blade 3. The other surface is grooved at 34 so as loosely to embrace the frusto conically shaped soft component 35 which also abuts against cell blade 4. In the embodiments of FIGURES 6a, 6b, 7, 8; 13a, 13b; and 14a and 14b the coupling elements are asymmetrical, and if desired we may arrange for the coupling elements of alternate cells in these embodiments to be reversed with respect to each other.

FIGURES 15a and 15b show a five component coupling element of the radially extending type. This element has two hard components 36 each having three parallel grooves 37 in its surface. The element is completed by three similar frusto conical soft components 38.

FIGURES 16a and 16b show yet another radially extending embodiment of a three component coupling element. There are two hard components 39 each having a large arcuate groove 40 extending across the face thereof. Each groove 40 has a locating channel 41 extending along its length. A soft component 42 of tapering cross section has locating ribs 43 which seat in the locating channels 41 when the element is first assembled.

We have found by experimental tests of a coupling having in its cell coupling elements of the type shown in FIGURES 5a, 5b, and 12a, 12b that improved characteristics and results were obtained as compared with couplings in which cell contained only a single element. Thus the coupling elements according to the invention showed less tendency to wear or break down in use and were more efficient in damping out vibrations both when there was a parallel misalignment of the driving and driven members and where there was an angular misalignment of such members. It was furthermore found that couplings having coupling elements according to the invention of the type shown in the above mentioned drawings were considerably easier to assemble than was the case with a single solid element in each cell.

It will be seen that a wide variety of multi-component coupling elements may be provided in couplings according to the invention. Due to the fact that at least one component of each element will always be soft and therefore relatively more easily deformable than the hard element or elements the insertion or replacement of elements in the coupling can be simply effected. By suitable selection of the non-metallic resilient materials for the hard and soft components the behavior of the coupling under light or heavy torque loads over a wide range can be determined as required.

It will be understood that we have only described some preferred embodiments of coupling elements by way of example and that variations and modifications both in the coupling elements and in the couplings themselves may be made without departing from the scope of the invention. Thus if desired we may provide a coupling in which the components in adjacent cells extend respectively radially and axially thereof. Again we may provide a coupling made up of three hard components arranged side by side with a soft component interposed between the outer and central hard components and on each side of said central component. In this instance we may so shape the components that one of such soft components extends radially of the coupling while the other extends axially thereof.

We claim:

1. A flexible torque transmitting device comprising a driven member and a driving member, each having a plurality of substantially, radially extending blades, the blades on each member extending towards the other member and defining with the members a plurality of cells, each cell having therein a coupling element consisting of at least two components of non-metallic resilient material at least one component in each cell being of a soft material and at least another component in each cell being of a harder material, at least one component of harder material being in contact with one of said blades, the components in each cell being disposed and arranged with respect to each other to permit relative movement to take place between adjacent contacting surfaces of the respective components of the coupling element upon the application of torque to the device, the respective components of said coupling elements being so shaped as to cause relative rolling movement between said hard and soft components when torque is applied to the coupling.

2. A device as claimed in claim 1 in which said soft component is of circular cross section disposed to permit relative rolling movement on an arcuate surface of a hard component, said hard component being of non-circular cross section.

3. A device as claimed in claim 1 in which said coupling elements each comprise one hard component having a recessed portion in a surface remote from one wall of a cell and a soft component in contact with said recessed portion and with another wall of said cell.

4. A device as claimed in claim 1 in which said coupling element comprises at least two hard components and at least one soft component disposed between the hard components said hard components being normally held spaced apart by said soft component and of such shape and size that when no torque is applied to the coupling the cell is not completely filled by said components.

5. A device as claimed in claim 1 having more than three components the two outer components being of greater hardness while the inner components are of different hardness to each other.

6. A coupling element for a flexible torque transmitting device comprising at least three assembled components, at least one of which is softer than the others and disposed therebetween, all said components being of non-metallic resilient material, said components being arranged side by side and having mutually contacting surfaces arranged to permit relative rolling movement between the surfaces upon the application of compression forces to the element.

7. A flexible torque transmitting device comprising a driven member and a driving member, each having a plurality of substantially radially extending blades, the blades on each member extending towards the other member and defining with the members a plurality of cells, each cell having therein a coupling element consisting of at least two hard components and a least one soft component, disposed between said hard components all said components being of non-metallic resilient material and said hard components being normally held spaced apart by said soft components and of such shape and size that when no torque is applied to the coupling the cell is not completely filled by said components.

References Cited by the Examiner
UNITED STATES PATENTS

| | | | |
|---|---|---|---|
| 1,504,279 | 8/24 | Spicer | 64—14 |
| 2,123,307 | 7/38 | Kattwinkel | 64—14 |
| 2,125,559 | 8/38 | Hamill | 64—14 |
| 2,621,493 | 12/52 | Croset. | |
| 2,764,003 | 9/56 | Croset | 64—14 |

BROUGHTON G. DURHAM, *Primary Examiner.*

ROBERT C. RIORDON, *Examiner.*